United States Patent
LaForgia

[15] 3,706,487
[45] Dec. 19, 1972

[54] PHOTOCHROMIC PROJECTION SYSTEM

[72] Inventor: Salvatore F. LaForgia, Toms River, N.J.

[73] Assignee: The United States of America as represented by the Secretary of the Army

[22] Filed: May 4, 1971

[21] Appl. No.: 140,176

[52] U.S. Cl............353/11, 178/5.4 BD, 350/174, 353/31, 353/34, 353/36, 353/37, 353/84
[51] Int. Cl..................G03b 21/00, G03b 21/14
[58] Field of Search.........353/30, 31, 34, 36, 37, 84, 353/35, 11, 12, 13, 14; 350/174; 178/5.4 BD

[56] References Cited

UNITED STATES PATENTS 3,601,470  8/1971  Juhlin...........................178/5.4 BD Primary Examiner—Leonard Forman
Assistant Examiner—Steven L. Stephan
Attorney—Harry M. Saragovitz, Edward J. Kelly, Herbert Berl and Daniel D. Sharp

[57] ABSTRACT

A photochromic projection system wherein indicia appearing on a cathode ray tube, and forming an opaque image on an ultraviolet-sensitive film positioned against the end face of the cathode ray tube, is imaged upon a viewing screen after passing through a transparent map. A pair of dichroic filters are used both of which reflect yellow and green radiation so that only the yellow and green portion of the radiation from an external illuminating source for the film is reflected to the film. The red and blue portion of the source radiation is transmitted through one of the dichroic filters and reflected from a mirror through the second dichroic filter where it is recombined with the yellow and green light reflected from the face of the cathode ray tube and from the second dichroic filter to provide an image in white light which then is directed through the transparent map onto the viewing screen.

10 Claims, 1 Drawing Figure

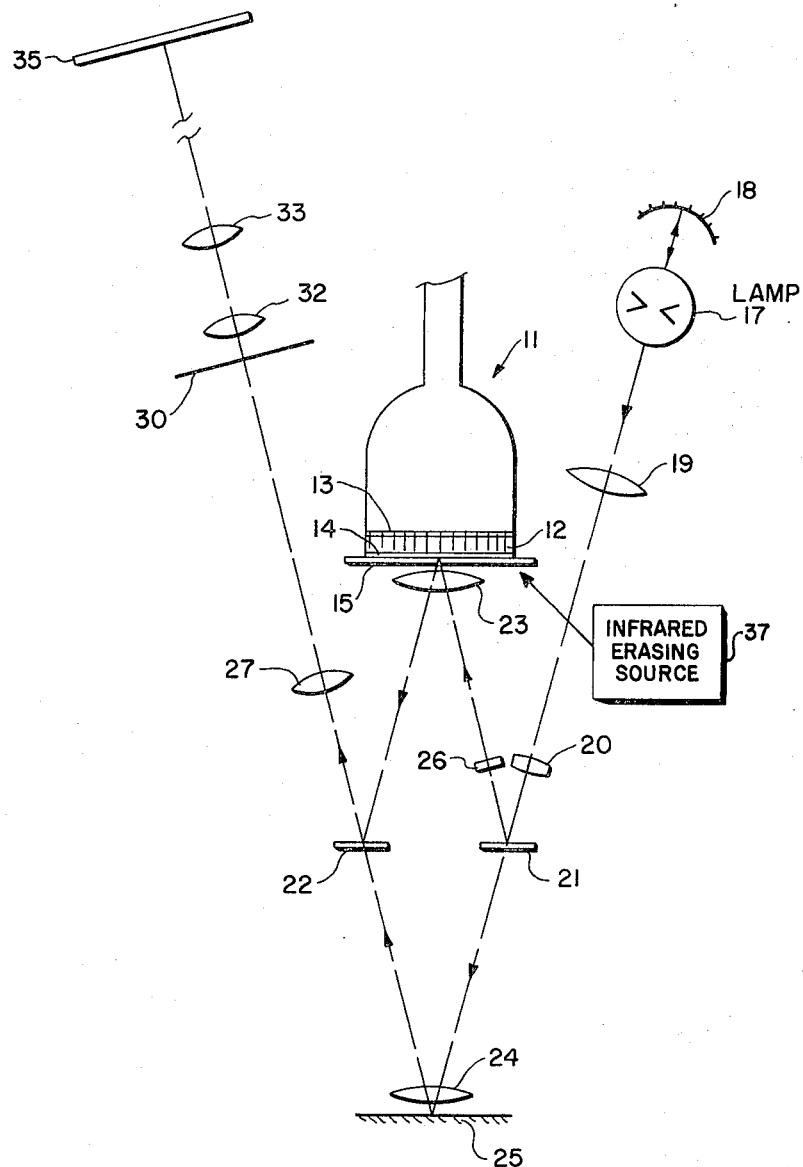

PHOTOCHROMIC PROJECTION SYSTEM

BACKGROUND OF THE INVENTION

Photochromic display systems are based upon the spectral energy absorption characteristics of photochromic materials such as certain photochromic dyes. Upon application of radiant energy of the proper spectral distribution, these dyes will change from the normal transparent condition to an opaque colored condition and will return to the transparent condition when irradiated (erased) by infrared energy. If an electron beam in a cathode ray tube is deflected onto a discrete region of a fluorescent coating on a fiber optic face plate, ultraviolet radiation is emitted from that region and can be directed through a corresponding portion of the fiber optic face plate and transmitted through a dichroic coating on the outer surface of the face plate to a film made of a photochromic material engaging said face plate. For reasons to be pointed out later, this dichroic coating reflects energy in the yellow and green portion of the spectrum. This transmitted ultraviolet radiation, when impinging upon the film strip, renders the latter opaque, and, if the fluorescent coating of the cathode ray tube screen has reasonable persistance, alpha-numeric characters or other elements of a scene can be written onto the photochromic film as a photochromic image of corresponding opaque configuration.

If the elements of a scene are to be viewed on a screen simultaneously with a map slide in true color, obviously white light should be used to illuminate the map slide, which, for example, may include brown contour lines, green representations of forests, blue representations of streams, and so forth. However, if an illuminating source for the projection system is a conventional source of white light, such as a xenon lamp, the energy therefrom which lies within the shorter wavelengths, viz., the blue and nearer ultraviolet, upon striking the photochromic film would be absorbed by the latter. The whole area of the photochromic film then would be rendered opaque, completely obliterating information written onto the film. Furthermore, the longer wavelengths, that is red and near infrared, incident upon the photochromic film would erase or render transparent the activated portion of the dye, again obliterating the image already written onto the film in response to the scanning of the cathode ray tube beam. The only portion of the energy spectrum of the white light source which would not effect appreciably the photochromic image on the film is the narrow bandwidth of light including yellow and green, which is centered at about 575 nanometers. Unfortunately, use of this narrow bandwidth of light would yield an image project on the screen of yellow background with dark characters or other scene indicia.

SUMMARY OF THE INVENTION

In accordance with the invention, a novel optical system has been designed which will permit the projection of dark symbols on a white screen background for maintaining the colors of the transparent map, while still using a white light source. This is achieved by directing the white light from a source situated at the focal point of a reflecting mirror onto a first of two dichroic filters having a reflective band centered at about 575nm, while transmitting the near ultraviolet blue, red and infrared portions of the spectrum. The reflective band of yellow and green light is focused onto the photochromic film. After passing through transparent regions of the film making up the photochromic film image, this yellow and green light is reflected from the dichroic coating on the cathode ray tube face plate. The yellow and green light thus reflected from the dichroic coated face plate and returning through the transparent portions of the photochromic film, is directed onto the second dichroic filter, where it is reflected. The remainder of the white light from the projection source which is detrimental to the photochromic image is transmitting through the first dichroic filter and onto a mirror which reflects the ultraviolet, blue, red and infrared radiation onto the second dichroic filter. This ultraviolet, blue, red and infrared radiation is transmitted through the second dichroic filter along the same path as the yellow and green light reflected from this same filter. A reconstituted white image of the photochromic plane (plane of film) is superimposed on the map plane by suitable focusing means, and the two superimposed images are projected simultaneously onto a viewing screen by an appropriate optical projector.

DESCRIPTION OF THE DRAWING

The FIGURE of the drawing is a diagram showing an embodiment of a photochromic image projection system according to the invention.

BRIEF DESCRIPTION OF THE PREFERRED EMBODIMENT

The single figure of the drawing shows a portion of the cathode ray tube 11 which, as is well known, contains an electron gun, electron beam deflection means, and suitable accelerating means, not shown. Since the principles of operation of a cathode ray tube are well known, only the portion thereof directly concerned with the optics of the projection system are illustrated. The cathode ray tube includes a fiber optic face plate 12 having the surface facing the electron gun coated with an appropriate phosphor 13 which, when impinged upon by the electron beam, generates ultraviolet radiation. Since the ultraviolet radiation emitted by the phosphor is not sharply confined, the fiber optic face plate 12 serves to improve the cathode ray tube resolution by guiding the ultraviolet radiation along the fiber, or fibers, in the vicinity of the impinging electron beam. The opposite surface of the fiber optic face plate 12 is provided with a coating 14 of dichroic material which is capable of transmitting the ultraviolet radiation propagating through the fiber optic face plate 12. The regions of the phosphor 13 which are impinged upon by the electron beam will radiate ultraviolet energy and this energy is transferred by way of the fiber optic face plate 12 to a photochromic film 15 in the form of corresponding opaque regions in said film. Thus, an image is formed at the photochromic film plane. The photochromic film 15 is mechanically biased against the face of the cathode ray tube face plate.

Before continuing with a description of FIG. 1, it should be pointed out that the various lenses are shown in the drawing as single lenses; in practice, however, some or all of these lenses can be a lens system consisting of a plurality of separate lenses.

White light emanates from the light source 17 which, for example, can be a 1,000-watt xenon arc lamp mounted at the focal point of a spherical reflector 18 which reflects in a forward direction a substantial portion of the luminous flux which otherwise would be dissipated in the reverse direction. A condensing lens 19 serves to gather as much light as possible from the source 17 and to image the source on a first field lens 20. The light diverging from field lens 20 is almost immediately incident upon a first dichroic (separating) filter 21 where the light is separated into two paths in order to keep the unwanted portion of the spectrum from being incident on the photochromic material 15. The field lens 20 forms a real image of the condensing lens 19 aperture on the apertures of both the relay condenser lens 23 adjacent the cathode ray tube 11 and relay condenser lens 24 adjacent the mirror 25; this assures an even distribution of illumination to the photochromic film plane and prevents vignetting (tapering in brightness toward the margin of the illuminating field) of the oblique beam from the condensing system 19. The first dichroic filter 21 reflects the yellow and green portion of the spectral energy of xenon source 17 toward the photochromic film 15, while transmitting the blue and red portions. Owing to the fact that the dichroic filter 21 and photochromic material 15 may not be sharply cut-off and that the filter 21 may not be 100 percent efficient, a yellow filter 26 may be placed in the optical path to absorb the small percentage (usually not more than about 5%) of ultraviolet and blue energy reflected by dichroic filter 21. The relay condenser 23 is used to transfer the yellow-green image of the source 17 from field lens 20 to the imaging relay lens 27. The incident yellow and green illumination proceeding from field lens 20 passes through the relay condenser 23, the photochromic film 15, is reflected by the dichroic coating 14 of the face plate of the cathode ray tube 11, and passes again through the film 15 and relay condenser 23. Although not shown in the drawing, the relay condenser 23 can have a spring loaded mount which contains a film pressure plate to insure that the photochromic film 15 is held firmly against the cathode ray tube 11 for proper resolution. The relay condenser 24 and mirror 25 are used to transfer the blue-red image of the source 17 from field lens 20 to the imaging relay lens 27. The second (recombine) dichroic filter 22, being identical with dichroic filter 21, will reflect the yellow-green light from relay condenser 23. At the same time, this filter 22 will transmit the blue-red portion of the spectrum which is being relayed by relay condenser 24 into the imaging relay lens 27, thus combining the two separated portions of the spectrum to form a white image of the source on the entrance pupil of the imaging relay lens 27. The projection path is folded about the normal to the central of the photochromic film field at an angle of 15°. The imaging relay lens 27 forms an image of the photochromic film plane 15 at the plane of the map 30. The imaging relay lens 27 can work at approximately 1-to-1 magnification if the relay condenser 23 is made to yield a virtual image of the photochromic field which is slightly displaced, erect and somewhat magnified. The relay condenser 32 yields a virtual, erect and magnified image of both the map slide 30 and the superimposed photochromic image and images the light source in the projection lens. The projection lens 33 projects the two magnified, superimposed, virtual images of relay condenser 32 onto a large viewing screen 35 in a short throw distance.

In practice, the stored image on the photochromic film written thereon by the ultraviolet beam eventually must be erased. This erasure can be accomplished, when necessary, by directing infrared energy from an infrared source 37 onto the photochromic film 15.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A projection system comprising an illuminating white light source emanating radiant energy extending from the infrared to the ultraviolet portion of the electromagnetic energy spectrum, a cathode ray tube having a screen which generates ultraviolet radiation in response to impingement thereupon of a position-controlled electron beam, said cathode ray tube further having a dichroic coated face plate for reflecting the yellow-green radiation, a photochromic film responding to said ultraviolet radiation for providing a photochromic film image, a pair of dichroic filters which reflect the yellow and green constituents of said radiant energy and transmit the remaining constituents of the radiant energy from said source, means for directing said radiant energy along a first path onto the first of said dichroic filters, said first dichroic filter reflecting the yellow and green constituents of said radiant energy along a second path through the photochromic film image plane to said dichroic coating, said yellow and green constituents reflecting from dichroic coating along a third path to said second dichroic filter, said yellow-green constituents reflecting from said second dichroic filter along a fourth path, the remaining constituents of said energy other than said yellow and green constituents being transmitted through said first dichroic filter along said first path, optic means including a reflector for reflecting said remaining constituents which are transmitted along said first path along said fourth path through said second dichroic filter.

2. The projection system of claim 1 further including a spherical reflector at the focal point of which said source is disposed.

3. The projection system of claim 1 further comprising a transparent map and image relay lens means for forming the image at said photochromic film plane onto the plane of said map.

4. The projection system of claim 3 further including field lens means disposed in said first path, said means for directing comprising condensing lens means for imaging said source onto said field lens means, said field lens imaging the aperture of said condensing lens onto said film and onto said reflector, an imaging relay lens means disposed in said fourth path, first relay condensing lens disposed adjacent said film for imaging the aperture of said field lens on said imaging relay lens means, said optic means further including second relay condensing lens means for imaging the aperture of said field lens on said imaging relay lens means, said imaging relay lens means imaging said photochromic film image on the plane of said map.

5. The projection system of claim 4 further including a spherical reflector at the focal point of which said source is disposed.

6. The projection system of claim 3 further including a projector assembly imaging both said map and said photochromic film image on said viewing screen and positioned along said fourth path between said map and said viewing screen, said projector assembly comprising third relay condensing lens means for yielding a virtual erect magnified image of both said map and said photochromic film image, and projecting lens means upon which said source is imaged and which projects the two magnified superimposed virtual images of said third relay condensing lens means onto said viewing screen in a short throw distance.

7. The projection system of claim 4 further including a projector assembly imaging both said map and said photochromic film image on said viewing screen and positioned along said fourth path between said map and said viewing screen, said projector assembly comprising third relay condensing lens means for yielding a virtual erect magnified image of both said map and said photochromic film image, and projecting lens means upon which said source is imaged and which projects the two magnified superimposed virtual images of said third relay condensing lens means onto said viewing screen in a short throw distance.

8. The projection system of claim 6 further including a spherical reflector at the focal point of which said source is located.

9. An image projection system comprising an illuminating white light source emitting radiant energy which extends from the infrared to the ultraviolet portion of the electromagnetic energy spectrum, a photochromic film which changes from a normal optically transparent condition to an optically opaque condition in response to controlled impingement thereupon of ultraviolet energy to form a photochromic image, first dichroic filter means for reflecting onto said film the spectral constituents of said radiant energy which have negligible effect on the photochromic properties of said film and for transmitting the remaining constituents of said radiant energy which would adversely affect the photochromic image, second dichroic filter means having the same optical reflection and transmission properties as said first dichroic filter means, optical means for directing said remaining constituents of said radiant energy transmitted by said first dichroic filter means onto said second dichroic filter means for transmission therethrough and means for directing the spectral constituents reflected from said film onto said second dichroic filter means, the energy emanating from said second dichroic filter means being reconstituted white light.

10. An image projection system according to claim 9 further including a viewing screen and a transparent data-bearing medium, and means for projecting a reconstituted white image of said photochromic film image through said transparent medium and onto said screen.

* * * * *